United States Patent
Schmitt

(12) 
(10) Patent No.: US 6,276,872 B1
(45) Date of Patent: Aug. 21, 2001

(54) LOW TEMPERATURE HEAT-ASSISTED EVAPORATION IMPOUNDMENT

(75) Inventor: Ralph J. Schmitt, Thousand Oaks, CA (US)

(73) Assignee: Envirosolve Corporation, Agoura Hills, CA (US)

( * ) Notice: Subject to any disclaimer, the term of this patent is extended or adjusted under 35 U.S.C. 154(b) by 0 days.

(21) Appl. No.: 09/422,772

(22) Filed: Oct. 22, 1999

(51) Int. Cl.[7] ............................... B09B 1/00; F24H 1/00
(52) U.S. Cl. ............................... 405/129.28; 405/128.6; 237/59
(58) Field of Search ............................... 405/56, 128, 129, 405/130, 131, 128.1, 128.15, 128.45, 128.6, 129.1, 129.2, 129.28, 129.57, 129.7; 237/56, 59, 63

(56) References Cited

U.S. PATENT DOCUMENTS

| | | | |
|---|---|---|---|
| 4,984,594 | * 1/1991 | Vinegar et al. | 405/129 X |
| 5,261,765 | * 11/1993 | Nelson | 405/128 |
| 5,375,539 | * 12/1994 | Rippberger | 110/238 |
| 5,788,412 | * 8/1998 | Jatkar | 405/128 |
| 5,813,799 | * 9/1998 | Calcote et al. | 405/128 |
| 5,836,718 | * 11/1998 | Price | 405/128 |

OTHER PUBLICATIONS

Das, Braja M., Principles of Geotechnical Engineering, Third Edition, PWS Publishing Company, pp. 596–599, 1994.*

* cited by examiner

Primary Examiner—William Neuder
Assistant Examiner—Tara L. Mayo
(74) Attorney, Agent, or Firm—Jack C. Munro

(57) ABSTRACT

The assisting in the evaporation of water from a surface impoundment or other impoundment that utilizes a closed heat pipe system that is partially submerged within the material of the surface impoundment. Water, or other heat transfer fluid, is circulated within the closed heat pipe system with this water being heated exteriorly of the surface impoundment prior to flowing within the portion of the heat pipe system that is located within the surface impoundment. The water is heated within the closed heat pipe system to an approximate temperature of one hundred seventy degrees Fahrenheit. The heating of the material in the surface impoundment is accomplished by the transfer of heat from the heat pipe system to the material in the surface impoundment. The rate of evaporation of water from the surface impoundment can be increased to more than thirty times the evaporation rate of a surface impoundment that doesn't utilize heat from an external source.

2 Claims, 1 Drawing Sheet

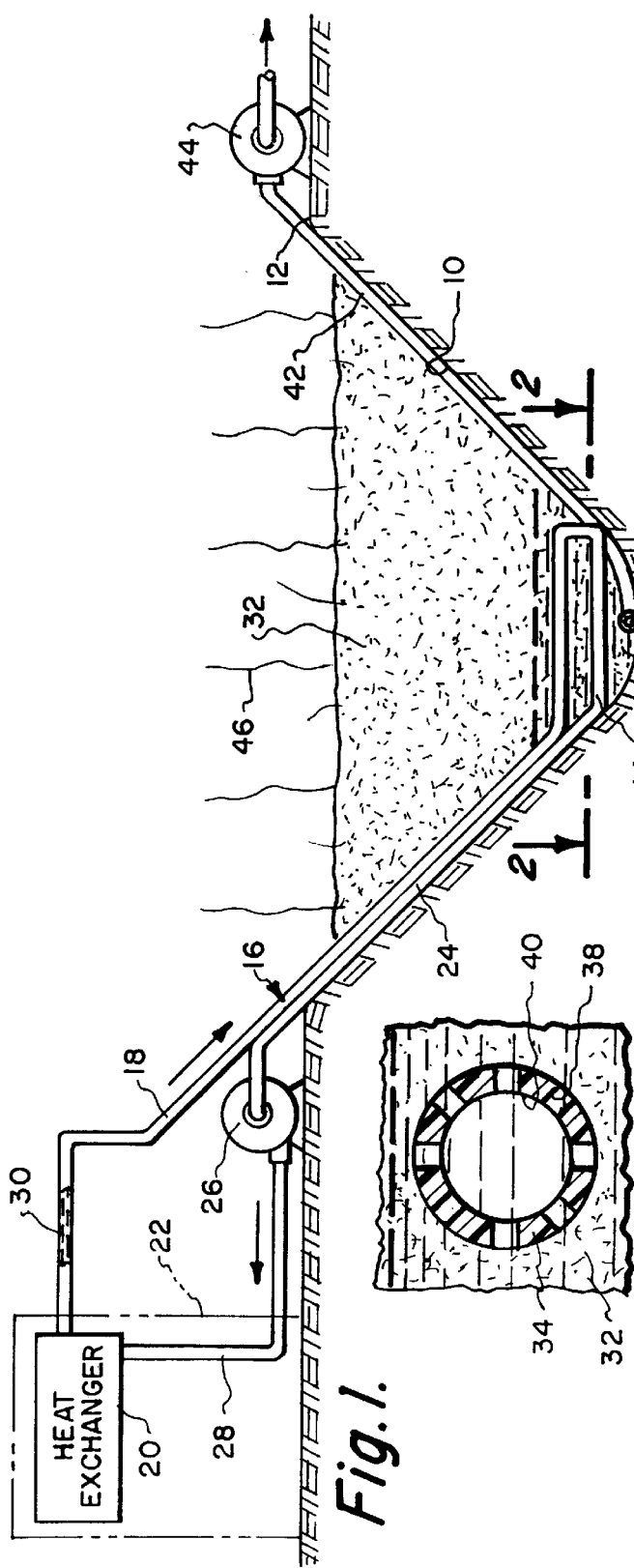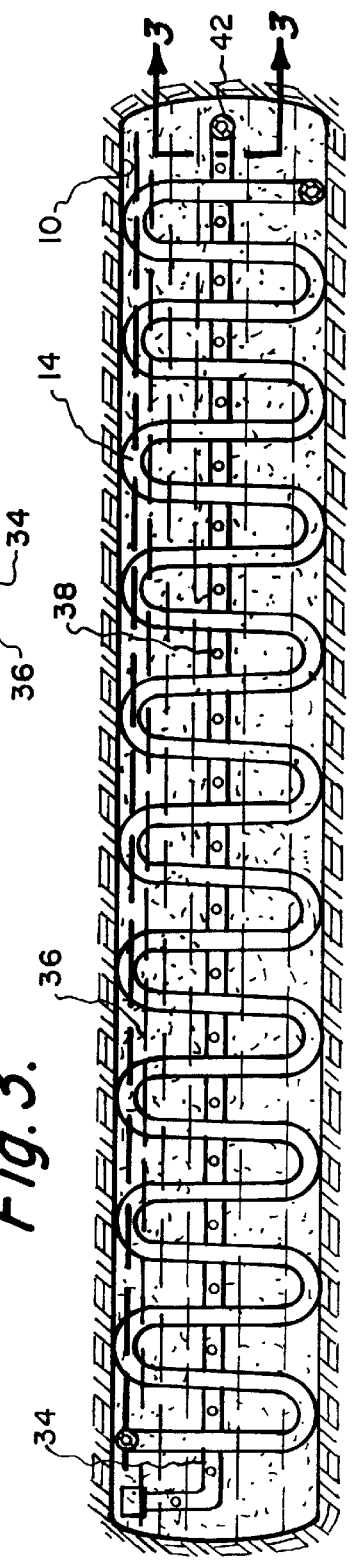

LOW TEMPERATURE HEAT-ASSISTED EVAPORATION IMPOUNDMENT

BACKGROUND OF THE INVENTION

1) Field of the Invention

The field of this invention relates to impoundments and specifically to the removal of accumulated water from an impoundment.

2) Description of the Prior Art

The subject matter of the present invention will be discussed primarily in conjunction with a landfill. However it is considered to be within the scope of this invention that this invention could be utilized with other impoundments. As far as this invention is concerned, an impoundment is to include any material that is contained within an enclosure. Typical material could comprise a liquid, such as a brackish water, and also it can comprise leachate from a solid waste landfill. The enclosure frequently will be formed within a recess formed within soil. However, the enclosure could also be a non-soil enclosure such as a fabricated type of structure.

Within the United States, the incineration of solid waste is restricted due to the potential for creation of air pollution. Therefore, communities have selected the use of a landfill for disposal of solid waste. A landfill generally takes the form of a ravine so that the natural configuration of the terrain can be utilized to form a large container into which the solid waste is deposited. The bottom or floor of this ravine is covered with a thick plastic sheet. Liquids from within the solid waste will settle to the bottom and rainwater will also be passed through the solid waste to the bottom. The liquid that accumulates at the bottom is called leachate. Mounted within the landfill at the bottom is a leachate removing pipe. A typical leachate removing pipe is a length of pipe, generally a plastic pipe, that is basically porous as by including a mass of holes through its sidewall along its longitudinal length. The leachate is to be moved by a pump through the leachate pipe exteriorly of the landfill and deposited at an exterior location. This leachate is considered to be a waste material, and generally it requires the leachate to be transported to a liquid waste treatment and disposal facility that is designed for the disposal of hazardous liquid waste material. This may require the transporting of the leachate hundreds of miles and the application of expensive treatment procedures. Inherently, the treatment and disposal of leachate is an expensive procedure.

Although the leachate may contain numerous dissolved and suspended solids, the primary constituent in leachate is water. Water not only is released from the solid waste but also the landfill receives water from rain. The landfill and the surface impoundment in which leachate is frequently stored is subjected to evaporation due to heat from the sun. However, in wet climates, the annual precipitation will be greater than the amount of evaporation. Therefore, if something can be done to increase the evaporation rate within the surface impoundment, then a substantially lesser amount of leachate can result with this leachate being far more concentrated containing dissolved and suspended solid materials requiring the treatment and disposal of a substantially smaller volume of this leachate. If all of the water can be removed from the leachate, it may be suitable for disposal without additional treatment in the same landfill from where it was generated.

SUMMARY OF THE INVENTION

The subject matter of the present invention is directed to the inclusion of a closed heat pipe system within the surface impoundment with the closed heat pipe system to conduct heat into the liquid waste material contained in the surface impoundment. This will cause raising of the temperature of the liquid waste in the surface impoundment and thereby increase the evaporation rate of the water from the surface impoundment by as much as thirty times or more. The closed heat pipe system includes a heat transfer fluid with generally water being preferred. This heat transfer fluid is to be raised to a temperature of as much as one hundred seventy degrees Fahrenheit with this raising of the temperature being accomplished by solar collectors or other heat sources, such as the combustion of a fuel. The heat transfer fluid is then pumped through that portion of the closed heat pipe system that is submerged in the liquid waste contained within the surface impoundment so that the heat can be transferred to the liquid waste. A surface impoundment operated in conjunction with a closed heat pipe system in this manner is called a Low Temperature Heat-Assisted Evaporation Impoundment (LTHAI). An LTHAI can increase the evaporation rate of water by thirty times or more at an operating temperature that is well below the boiling point of water. In time, suspended solids accumulate in the leachate in the LTHAI as water evaporates and the solids precipitate to prevent the leachate from becoming supersaturated. The accumulated dissolved and suspended solids can be separated from the leachate in a conventional cooling crystallization process. The cooling crystallization process can be conducted exteriorly of the LTHAI or it can be conducted within the LTHAI by allowing the contents of the LTHAI to cool.

Without the application of external heat, surface impoundments are not practical in most of the United States because annual precipitation exceeds the annual evaporation from the surface impoundment. In an average year, the impoundment will gain water instead of losing water. This situation can be reversed by the heating of the liquid in the surface impoundment to increase the evaporation from the impoundment to thirty times or more than the rate from an unheated impoundment.

An advantage of the present invention is that the addition of heat to an impoundment is a technically simple procedure which can be constructed to operate unattended for extended periods of time thereby having a minimal labor expense.

Another advantage of the present invention is that the heated water utilized in conjunction with the closed heat pipe system is heated to a maximum temperature which is substantially below the boiling point of water which thereby reduces the chance of any maintenance individual incurring a severe burn from contacting the heated water or the closed heat pipe system.

Another advantage of the present invention is that a low-quality or low temperature heat source can be used to heat the heat transfer fluid in the closed heat pipe system. Such low-quality or low temperature heat sources are usually considered waste heat and have little or no value for other uses.

Another advantage of the present invention is that the heating of the surface impoundment is not to the temperature that would occur if the heating was accomplished by a boiling liquid evaporator. A boiling liquid evaporator accelerates the production and release of odorous compounds. Therefore, the evaporation system of the present invention reduces the creation of noxious odors which can prove to be, at the very least, undesirable and actually can present a health hazard to any individual that is in close proximity to the landfill.

BRIEF DESCRIPTION OF THE DRAWING

FIG. 1 is a diagrammatic view of a Low Temperature Heat Assisted Evaporation Impoundment (LTHAI) which includes the evaporation system of the present invention;

FIG. 2 is a cross-sectional view taken through the bottom of the LTHAI showing more clearly the portion of the closed heat pipe system mounted within the LTHAI and also the leachate extraction pipe which is mounted within the LTHAI; and FIG. 3 is a cross-sectional view taken through the leachate extraction pipe taken along line 3—3 of FIG. 2.

DETAILED DESCRIPTION OF THE PREFERRED EMBODIMENT

Referring particularly to the drawing, there is shown a recessed area 10 formed within soil 12. This recessed area 10 will normally be covered with sheet plastic, which is not shown. Mounted within the recessed area 10 exteriorly of this plastic is a convoluted portion 14 of a closed heat pipe system 16. Connecting with the portion 14 is an inlet pipe 18. This inlet pipe 18 is conducted from a heat exchanger 20 which is mounted within a combustion chamber 22. Instead of combustion chamber 22, there could be used an array of flat plate solar collectors or waste heat from an industrial process. The portion 14 also includes an outlet pipe 24 which connects to a pump 26. From the pump 26 there is a pipe 28 that also connects to the heat exchanger 20. Contained within the closed loop pipe system 16 is a heat transfer liquid 30 with the typical liquid being water. It is to be understood that this liquid 30 is never intended to flow exteriorly of the heat pipe system 16.

Within the combustion chamber 22, gas is to be combusted with the typical source of the gas being the waste methane that is extracted from the landfill. Heat from existing landfill gas flare (not shown) can be used as the heat source within the combustion chamber 22. This normally wasted heat from the flare is recovered by the heat exchanger and is intended to heat the liquid 30 contained within the heat exchanger 20 to approximately one hundred seventy degrees Fahrenheit which is then conducted within inlet pipe 18 to the convoluted portion 14. The water as it leaves the convoluted portion of the outlet pipe 24 is then approximately at one hundred thirty degrees Fahrenheit, which is approximately the same temperature of the water within the pipe 28. Therefore, the waste heat that is applied to the heat exchanger 20 raises the temperature of the water contained within the heat pipe system 16 approximately forty degrees Fahrenheit.

A typical material of construction for the closed heat pipe system 16 would be a high density polyethylene (HDPE). HDPE was selected because it is inexpensive, has a reasonable coefficient of thermal conductivity (approximately three times that of most plastics) and has a slippery surface which decreases the attachment of precipitates from the leachate. Utilizing of this invention, the leachate will eventually be concentrated until certain dissolved solid ingredients will become supersaturated and begin precipitating out of solution to form solid deposits within the surface impoundment 32. This leachate will be removed by a leachate extraction pipe 34 which is mounted at the bottom 36 of the surface impoundment 32. This leachate extraction pipe 34 is constructed to be porous, and one way that it can be constructed to be porous is by including a mass of holes 38 formed through the wall of the pipe 34. Therefore, the leachate is to be conducted through the hole 38 to be located within the internal chamber of the leachate extraction pipe 34. The leachate extraction pipe 34 is then connected to an outlet pipe 42 which in turn is connected to a pump 44. From the pump 44, the leachate is to be deposited at an appropriate depositing location, which is not shown.

It is understood that the primary objective of this invention is that by utilizing the closed heat pipe system 16 that the overall temperature of the liquid in LTHAI 32 is increased which causes the evaporation 46 of water into the ambient from the surface of the LTHAI 32. In some environments it may be desirable to preconcentrate the leachate by the utilizing of reverse osmosis treatment to remove water from the leachate. When utilizing of reverse osmosis treatment, the overall volume of the leachate can be reduced by the removal of water until the leachate becomes saturated with dissolved solids. As much as eighty percent of the water can be removed from leachate before the remaining leachate becomes saturated with dissolved solids.

The addition of heat to the surface impoundment 32 can increase the water evaporation rate from the surface impoundment 32 as much as thirty times the evaporation rate from a similar surface impoundment, which does not have an external heat source. Stated in another way, the conversion of a surface impoundment 32 to an LTHAI 32, by the addition of a closed heat pipe system, can increase the evaporation rate by as much as thirty times. The technology of this invention is of significant importance to surface impoundments that are operated in wet climates where annual rainfall exceeds the evaporation rate from the surface impoundment. The cost of the external heat is minimal as most landfills are able to utilize the expelled methane gas from the landfill itself that is normally generated from the decaying solid waste. The landfill gas is burned to produce an exhaust gas at a temperature of approximately fifteen hundred degrees Fahrenheit. This hot exhaust gas is passed through the heat exchanger 20 to heat the liquid 30 contained within the heat exchanger 20 to approximately one hundred seventy degrees Fahrenheit.

As previously mentioned, the leachate that is removed by the leachate extraction pipe 34 is added back to the LTHAI 32 after the suspended solid and precipitated solid materials have been removed from the liquid leachate. The precipitation of solid materials from the leachate begins when the total dissolved solids concentration within the leachate has been increased to the approximate range of 50,000 to 100,000 milligrams per liter. This can be done by utilizing pump 44 to pump the leachate 32 into another impoundment where it is allowed to cool so that approximately one-half of the dissolved solids will precipitate and settle to the bottom of this impoundment, which is not shown. The remaining leachate liquid can then be pumped back to the LTHAI for additional evaporation treatment.

The leachate is frequently produced under anaerobic conditions which favor the generation of odorous sulphur and ammonia compounds. These odorous compounds become a nuisance if such a release to the atmosphere moves away from the landfill due to prevailing air currents. Heating of the leachate can greatly increase the release rate of odorous compounds. Most of these compounds can be destroyed by biological oxidation treatment in an aerobic biological treatment process. Aerobic biological treatment of leachate is suspected to be a desirable pretreatment procedure at most landfills. The removal of the nuisance odor generating compounds from the leachate is essential to the success of a leachate evaporation project. If biological oxidation treatment does not remove a sufficient amount of the odor, additional carbon absorption and hydrogen peroxide oxidation treatment processes can be applied.

Another form of a heat transfer mechanism could comprise a venturi or vaned device in which the hot exhaust gas from the combustion of the landfill gas is directly mixed with the leachate to be heated. The mixture of heated leachate and cooled landfill gas combustion products will then be separated in a water knockout drum or cyclone separator designed with a low gas velocity to allow the water droplets to settle downward while the cool gases discharge upward.

This invention has been described with reference to its application for the treatment of landfill leachate. It is also suitable for the treatment of other liquids such as waste brine, cooling tower blow-down water, power house steam boiler blow-down water, oil field production waste brine, processing wastewater and any other water that contains a high concentration of dissolved solid material that cannot be readily treated with conventional evaporation equipment.

What is claimed is:

1. A heat-assisted evaporation impoundment comprising:
    a recessed area formed within soil, said recessed area having a top open to ambient and a closed bottom, said recessed area being for the purpose of collecting of material which includes water;
    a closed heat pipe system mounted within said recessed area and extending exteriorly of said recessed area, a portion of said closed heat pipe system being submerged within the material;
    pump means connecting to said closed heat pipe system, said pump means to cause movement of a liquid through said closed heat pipe system with this liquid being approximately at 170° Fahrenheit; and
    means for heating connected to said closed heat pipe system, said means for heating to raise the temperature of said liquid prior to flowing into said portion of said closed heat pipe system where heat is extracted from said liquid prior to leaving of said recessed area within said closed heat pipe system causing raising of the temperature of the material and increasing evaporation of said water from the material, said means for heating using waste heat produced by the combustion of volatile gases removed from the impoundment.

2. The method of removing water from an impoundment comprising:
    mounting of a closed heat pipe system in conjunction with said impoundment where said heat pipe system is at least partially contained within said impoundment;
    obtaining waste heat by the combustion of volatile gases removed from the impoundment
    utilizing of said waste heat to raise the temperature of a liquid contained within said closed heat pipe system to a temperature of approximately 170° Fahrenheit; and
    circulating of said liquid through said closed heat pipe system which causes material contained within said impoundment to be raised in temperature increasing evaporation of water from said impoundment.

* * * * *